Aug. 23, 1966  H. HIGGS  3,268,214
COMBINED MIXER AND CONVEYOR UNITS
Filed Dec. 13, 1963  6 Sheets-Sheet 2

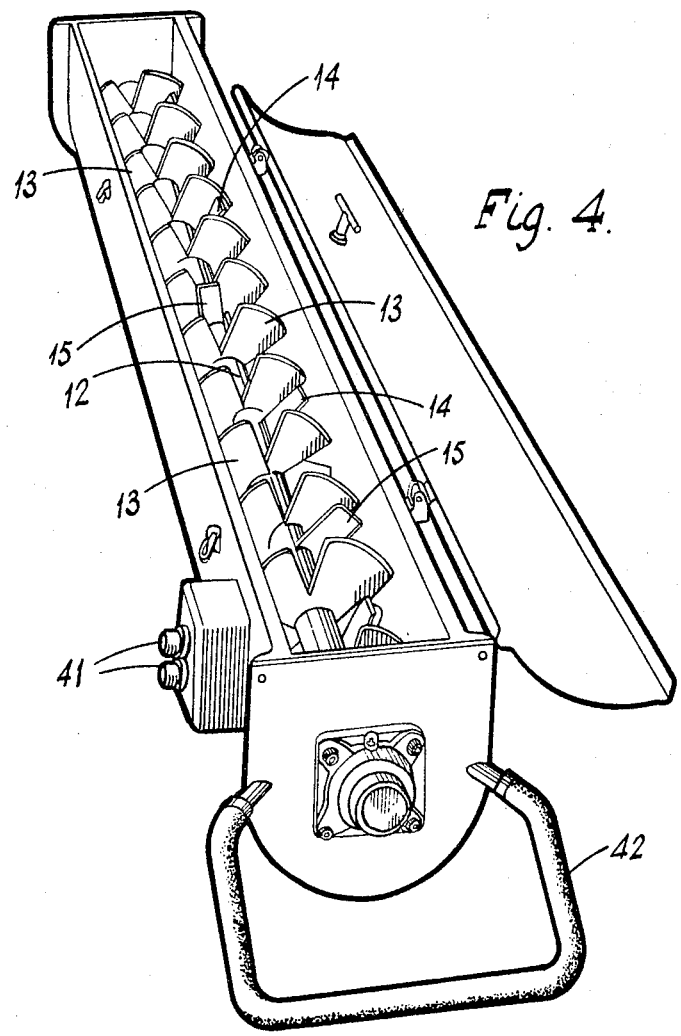

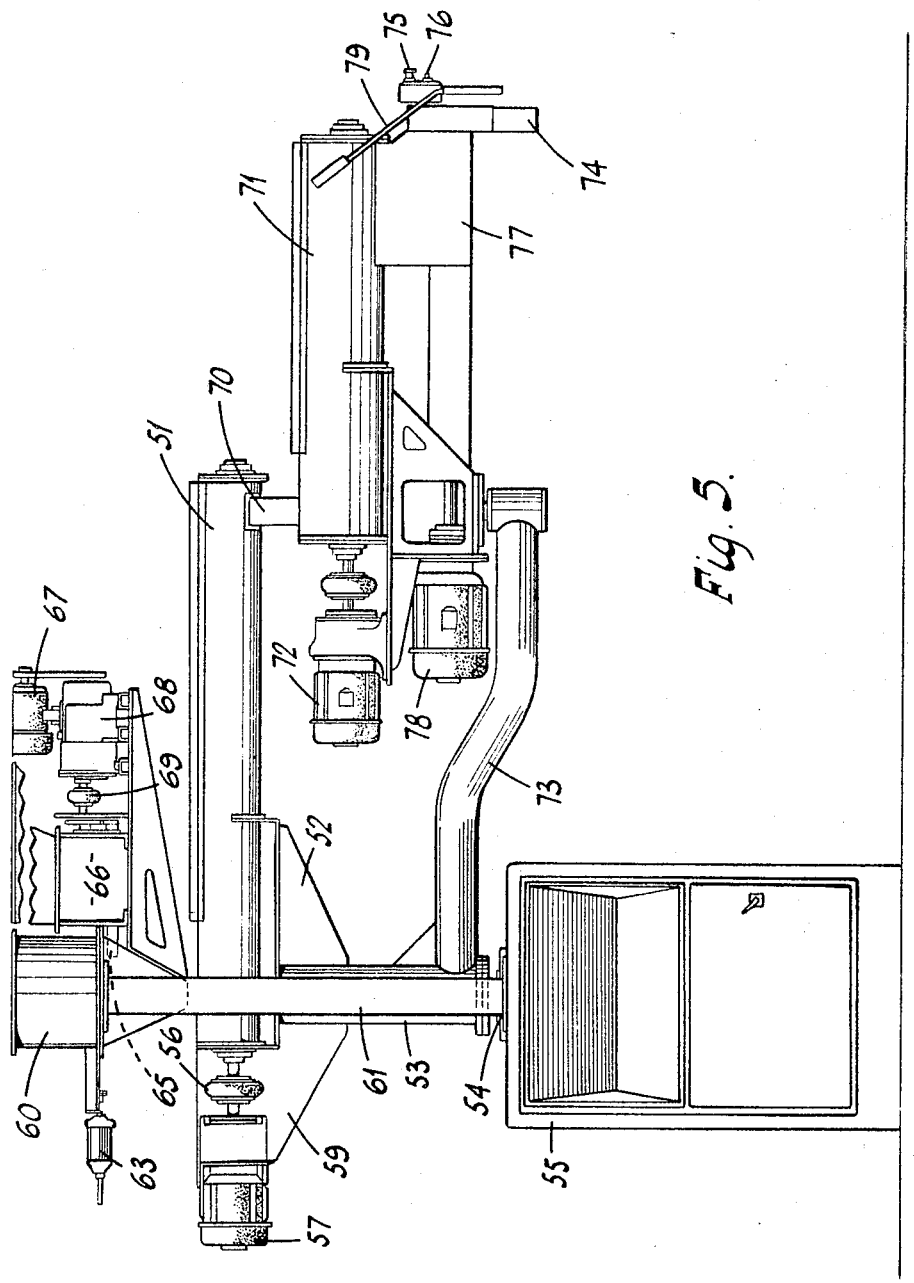

United States Patent Office 3,268,214
Patented August 23, 1966

3,268,214
COMBINED MIXER AND CONVEYOR UNITS
Harold Higgs, Oaken, near Wolverhampton, England, assignor to Fordath Engineering Company Limited, Stafford, England, a British company
Filed Dec. 13, 1963, Ser. No. 330,459
2 Claims. (Cl. 259—10)

This invention relates to combined mixer and conveyor units for mixing sand or like particulate material with other constituents, the particulate material and the constituents being moved linearly through the unit from the inlet end to the discharge end thereof so that they are mixed as a result of being conveyed through the unit.

It is an object of the present invention to provide a new or improved form of mixer and conveyor unit by means of which the distribution of the mixed materials in a core box or the like is facilitated.

According to this aspect of the present invention I provide a combined mixer and conveyor unit which includes a supporting unit, a horizontally extending primary conveyor unit, means for feeding materials to one end of the primary conveyor unit, a discharge nozzle at the other end of the primary conveyor unit, drive means for the primary conveyor unit, a horizontally extending secondary conveyor unit having an opening at its one end in communication with the discharge nozzle of the primary conveyor unit, a discharge nozzle at the other end of the secondary conveyor unit and drive means for the secondary conveyor unit, the primary conveyor unit being adapted to be pivoted with respect to the supporting unit and the secondary conveyor unit being adapted to be pivoted with respect to the primary conveyor unit, each conveyor unit including a longitudinally extending shaft having mounted thereon a plurality of helically disposed blades and there being interposed between some of the helically disposed blades radially extending blades some of which have their faces disposed in a plane normal to the axis of the shaft while others are disposed so that their faces are in a plane parallel to the axis of the shaft.

The invention will now be described by way of example and with reference to the accompanying drawings in which.

Figure 1:
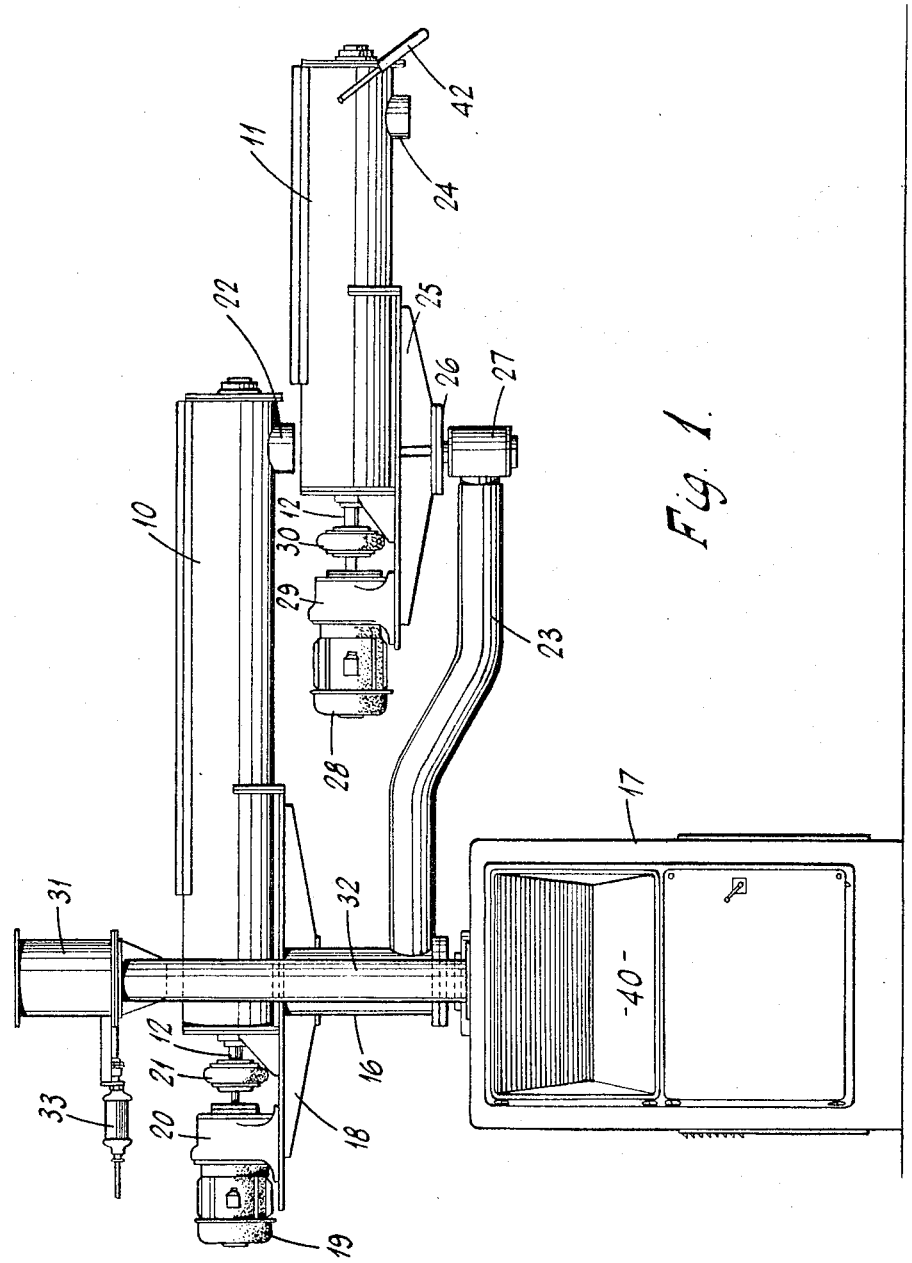
FIGURE 1 is a side elevation of a mixer and conveyor unit.
Figure 2:
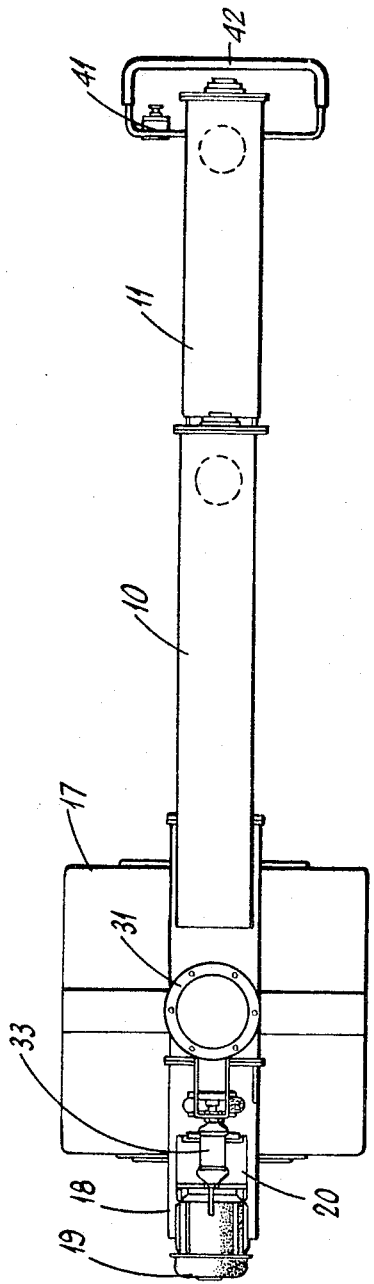
FIGURE 2 is a plan view of the mixer and conveyor unit.
Figure 6:
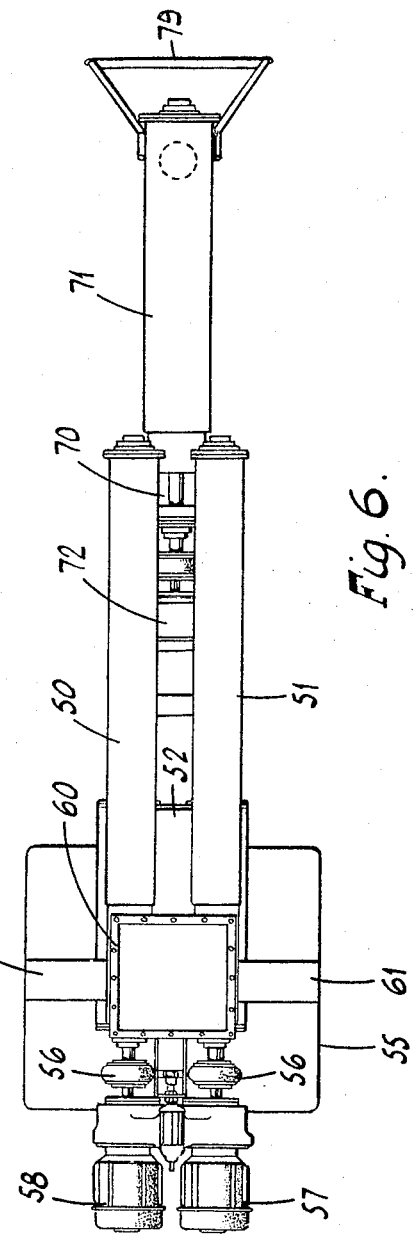
Figure 3:
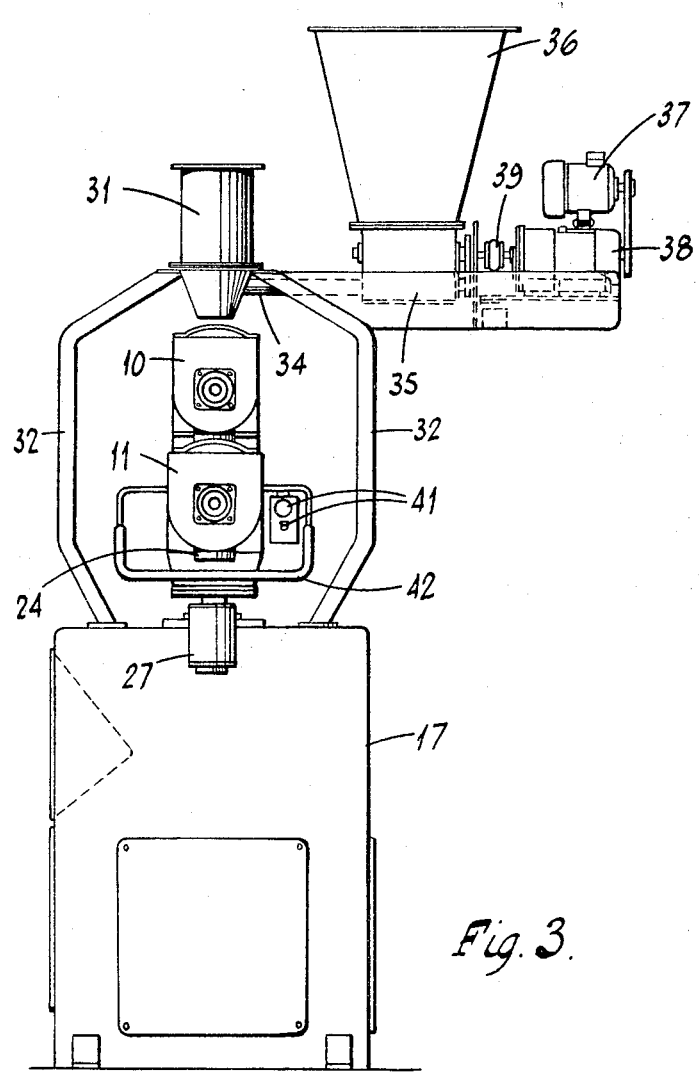
Figure 7:
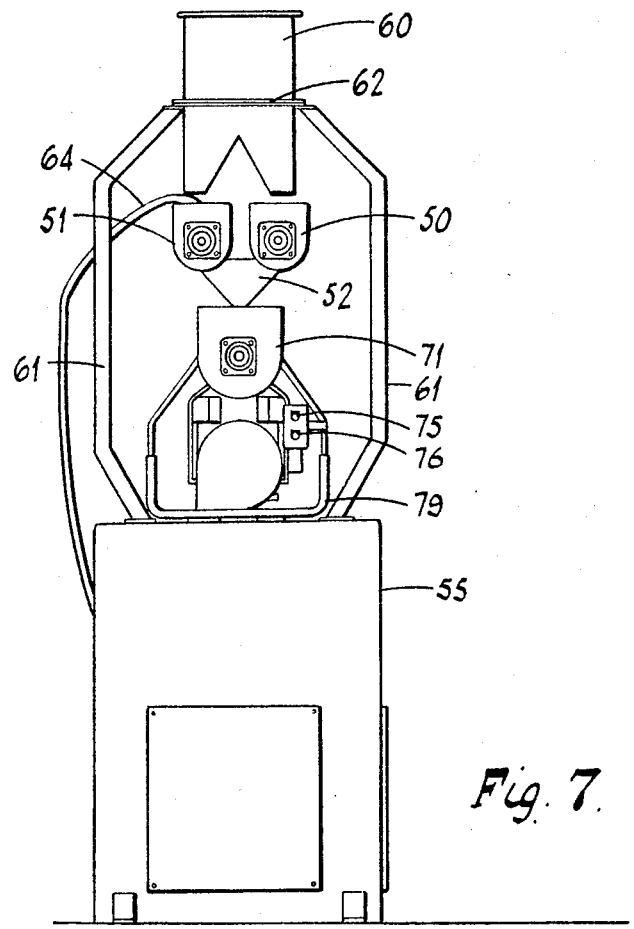

FIGURE 3 is an end elevation of the mixer and conveyor unit with the addition of a powdered material feed unit, FIGURE 4 is a perspective view of the secondary conveyor unit, FIGURE 5 is a side elevation of an alternative embodiment of the invention showing a powdered material feed unit, FIGURE 6 is a plan view of the mixer and conveyor unit shown in FIGURE 5 with the powdered material feed unit omitted, and, FIGURE 7 is an end elevation of the combined mixer and conveyor unit shown in FIGURE 6.

The combined mixer and conveyor unit shown in FIGURES 1 to 4 includes a pair of horizontally extending conveyor units, a primary conveyor unit 10 and a secondary unit 11. The two conveyor units are similar in construction and the secondary conveyor unit 11 is shown in detail in FIGURE 4. Each conveyor unit includes a screw type conveyor which includes a longitudinally extending shaft 12 and a number of helically disposed blades 13. The screw is interrupted at one or more positions and mixing blades are secured to the shaft 12 at these positions. Some of the mixing blades 14 are disposed so that their plane faces are parallel to the axis of the shaft 12 and other mixing blades 15 are disposed so that their plane faces are normal to the axis of the shaft 12.

The primary conveyor unit 10 is supported adjacent one end thereof upon a pillar 16 connected to a supporting unit 17, the arrangement being such that the primary conveyor unit 10 can be swung about a vertical axis with respect to the supporting unit 17. The conveyor unit 10 is secured to a longitudinally extending beam 18 secured to the pillar 16. Also carried by the beam 18 is an electric motor 19 which is coupled through a gear box 20 and through a coupling 21 to the shaft 12 of the conveyor.

Adjacent its other end the underside of the primary conveyor unit 10 is provided with a discharge opening leading to a nozzle 22 secured thereto to provide controlled discharge of the material to the secondary conveyor unit 11. Between the discharge opening and the adjacent end of the primary conveyor unit 10 the hand of the conveyor screw is reversed so as to ensure that all material is discharged from the primary conveyor unit 10 and to prevent build-up of material at the end of the unit. The secondary conveyor unit 11 is mounted on a horizontally extending beam 23 which is itself secured to the pillar 16. The beam 23 can be pivoted about a vertical axis with respect to the supporting unit 17. The secondary conveyor unit 11 is provided with an opening near that end which is in communication with the discharge nozzle 22 of the primary conveyor unit and adjacent its other end the underside of the unit is cut away to provide a discharge opening. A downwardly extending nozzle 24 is secured to this opening to provide controlled discharge of the material. Between the discharge opening and the adjacent end of the secondary conveyor unit 11 the hand of the conveyor screw is reversed so as to ensure that all material is discharged from the unit.

The secondary conveyor unit 11 is secured to a horizontally extending beam 25 which is itself secured to a downwardly extending shaft 26 which engages in a bearing 27 secured to the horizontally extending beam 23. The secondary conveyor unit 11 can be pivoted with respect to the primary conveyor unit 10 about a vertical axis passing through its opening. Also carried by the beam 25 is an electric motor 28 which drives the shaft 12 of the conveyor of the secondary conveyor unit through a gear box 29 and a coupling 30.

Mounted above that end of the primary conveyor unit 10 which is supported by the pillar 16 is a loading unit which includes a sand hopper 31 supported from the supporting unit 17 by means of struts 32. There is mounted in the hopper adjacent the lower end thereof a sand gate (not shown) which includes a pair of apertured plates which can be moved relative to each other to vary the size of the discharge opening of the hopper and thus the rate of feed of sand. The sand gate also includes a closure plate which can be moved so as to close the discharge opening of the hopper, the closure plate being operated by a hydraulic cylinder 33.

Leading into the lower end of the hopper 31 and below the sand gate is a nozzle 34 through which powdered materials are fed. The powdered material is fed by a suitable worm-type feeder 35 from a hopper 36 at a rate which can be adjusted to give the desired feed and the desired proportions between the sand and the powdered material. The worm-type feeder 35 is driven from a motor 37 through a gear box 38 and a coupling 39. The supporting unit 17 carries a control panel 40 for effecting the various operations of the machine. The drive to the conveyor units 10 and 11, the worm-type feeder 35 and operation of the sand gate are all operated through the control panel 40 by means of stop and start buttons 41 which are mounted adjacent the discharge nozzle 24 of the secondary conveyor unit 11. A handle 42 is provided at the end of the secondary conveyor unit 11 adjacent the discharge nozzle 24 so that an operator can pivot the secondary conveyor unit with respect to the primary conveyor unit which can itself be pivoted about a vertical axis with respect to the supporting unit 17.

In order to ensure that all the mixed sand has been discharged from the machine a time delay circuit may be provided so that the conveyor unit will continue operating for a predetermined time after the stop button has been pressed.

Instead of mixing powdered material with the sand a liquid resin or oil may be mixed with the sand and this is conveniently fed from a metering pump contained in the supporting unit 17.

The pillar 16 may be supported from the supporting unit 17 by means of a number of hydraulic rams (not shown) instead of by means of a bearing as shown in the drawings so that the pillar 16 together with the two conveyor units 10 and 11 can be moved vertically relative to the supporting unit 17.

In the embodiment shown in FIGURES 5 to 7 the combined mixer and conveyor unit is specifically designed for mixing sand, a binder, e.g. an oil such as linseed oil and an accelerator or catalyst, e.g. sodium perborate, to provide a cold setting mix for use in filling core boxes. The unit includes a pair of primary conveyor units 50 and 51 which are mounted side by side and which are carried by a common base member 52 which is bolted to a vertical pillar 53 which is rotatably supported in a bearing housing 54 at the upper end of a main supporting unit 55 which is adapted to stand upon a floor or like surface. The primary conveyor units 50 and 51 are similar to that shown in FIGURE 4 and include a trough-like base in which a longitudinally extending shaft is mounted. The shaft has secured thereto a plurality of angularly and axially spaced helically arranged blades by means of which material fed into one end of the unit is mixed and conveyed through the unit as the shaft rotates. In order to assist a thorough mixing of the materials mixing blades are provided and some of these are secured to the shaft so that they present an edge face to the material passing along the unit whilst others are secured to the shaft so that they present a flat face to the material. The shafts in the two primary units are driven through suitable couplings 56 from electric motors 57 and 58 which are carried on an extension 59 of the base member 52 which is disposed on the opposite side of the upstanding pillar 53 to the conveyor units'

A sand hopper 60 is mounted above the ends of the primary conveyor units 50 and 51 and is supported by struts 61. The sand hopper 60 is adapted to provide a continuous supply of sand to each unit and includes a laterally movable sand gate 62 by means of which the rate of flow of sand from the hopper 60 can be controlled. The gate may be opened and closed by means of a hydraulic cylinder 63.

Also disposed adjacent the inlet end of the primary unit 51 is a discharge nozzle 64 from a suitable metering pump (not shown) disposed inside the supporting unit 55 through which the oil binder is supplied whilst adjacent the inlet end of the other primary unit 50 is the discharge point 65 from a suitable dispenser for powdered material, e.g. a worm-type feeder 66, driven by a motor 67 through a gear box 68 and a coupling 69. Sodium perborate catalyst can be fed at a controlled rate to this primary unit 50. Thus to the one primary unit 51 sand and oil are fed at a controlled rate whilst sand and sodium perborate are fed at a controlled rate to the other primary unit.

Each primary unit is provided at that end thereof which is remote from the pillar 53 with a suitable discharge orifice 70 through which the mixed material is discharged and both discharge orifices discharge to the inlet end of a secondary conveyor unit 71. The secondary conveyor unit 71 is constructed in a similar manner to the secondary unit of the first embodiment of the invention, shown in FIGURE 4. The mixer and conveyor mechanism in the secondary unit 71 is driven from a separate electric motor 72 to those of the primary units and the secondary unit 71 is pivotally supported at one end of a beam 73 whose other end is secured to the pillar 53. Thus the unit as a whole is articulated in that the primary units 50 and 51 can swivel about a vertical axis with respect to the supporting unit 55 and the secondary unit 71 is swivelable about its supporting beam 73, the pivotal mounting of the secondary unit 71 on its beam 73 being in alignment with the discharge orifices 70 from the primary units 50 and 51.

That end of the secondary unit 71 which is remote from the primary units 50 and 51 is provided with a suitable discharge nozzle 74 whereby the completely mixed material can be discharged into core boxes or the like and at this end of the secondary unit 71 there is provided a suitable control panel including a pair of push buttons 75 and 76 whereby the operator can start or stop the entire unit.

An impeller unit 77 driven by a motor 78 is fitted adjacent the discharge nozzle 74 so as to assist in positive discharge of the mixed materials from the unit.

An operator can thus control the machine, the rates of flow having been previously set up before a run is commenced and can also swivel the unit 71 by means of a handle 79 so as to obtain an even spread of discharged material over the core box.

The constituents of the cold setting mix will not react until the catalyst and the oil is mixed so that when the operator switches off the machine it is only necessary for the mixer and conveyor units in the secondary unit 71 to carry on running for a sufficient length of time to clear material in that unit. The material which may be present in the two primary units 50 and 51 may remain there until such time as the machine is re-started for the sand and oil on the one hand and the sand and catalyst on the other hand will not react and no blockage or undesirable build-up of material will take place in the primary units. The necessity for periodic cleaning and maintenance is thus considerably reduced in that this is only necessary in respect of the secondary unit 71.

The controls for setting the rate of flow of the catalyst and of the oil may be disposed in the main supporting unit 55 and once these have been set in accordance with the particular mix required the operation of the unit can be entirely controlled by the operator.

Instead of using an oil binder a resin may be used and in this case resin is supplied to the inlet end of the primary unit 51 from a metering pump in the supporting unit 55 and a catalyst, usually an acid, is supplied to the inlet end of the other primary unit 50 from a further metering pump in the supporting unit 55.

Instead of employing a single sand hopper as described above a pair of sand hoppers may be mounted side by side above the inlet ends of the primary conveyor units, each hopper having an independently adjustable sand gate.

Instead of employing a pair of electric motors 57 and 58 for driving the conveyor mechanisms of the two primary conveyor units 50 and 51 a single electric motor may be employed.

What I claim then is:

1. A combined mixer and conveyor unit which includes a supporting unit, a horizontally extending primary conveyor unit, means for feeding materials to one end of the primary conveyor unit, a discharge nozzle at the other end of the primary conveyor unit, drive means for the primary conveyor unit, a horizontally extending secondary conveyor unit having an opening at its one end in communication with the discharge nozzle of the primary conveyor unit, a discharge nozzle at the other end of the secondary conveyor unit and drive means for the secondary conveyor unit, the primary conveyor unit being adapted to be pivoted with respect to the supporting unit and the secondary conveyor unit being adapted to be pivoted with respect to the primary conveyor unit, each conveyor unit including a longitudinally extending shaft having mounted thereon a plurality of helically disposed blades and there being interposed between some of the helically disposed blades radially extending blades some of which have their faces disposed in a plane normal to the axis of the shaft while others are disposed so that their faces are in a plane parallel to the axis of the shaft.

2. A combined mixer and conveyor unit according to claim 1 in which the secondary conveyor unit is mounted on a horizontally extending beam and is adapted to pivot with respect to the primary conveyor unit about a vertical axis passing through the opening in the secondary conveyor unit.

References Cited by the Examiner

UNITED STATES PATENTS

| | | | |
|---|---|---|---|
| 219,945 | 9/1879 | Hogan | 259—136 |
| 1,518,898 | 12/1924 | Brunner | 198—88 |
| 2,806,678 | 9/1957 | Stevens et al. | 259—10 |

FOREIGN PATENTS

| | | |
|---|---|---|
| 558,339 | 6/1958 | Canada. |
| 77,115 | 12/1961 | France. |
| 2,231 | 2/1887 | Great Britain. |

WALTER A. SCHEEL, *Primary Examiner.*

JOHN M. BELL, *Assistant Examiner.*